United States Patent Office 3,068,305
Patented Dec. 11, 1962

3,068,305
PROCESS FOR PREPARING PURE ISOBUTYLENE
Robert Y. Heisler, Fishkill, and Howard V. Hess, Glenham, N.Y., assignors to Texaco Inc., New York, N.Y., a corporation of Delaware
No Drawing. Filed July 28, 1959, Ser. No. 829,972
8 Claims. (Cl. 260—682)

This invention relates to a process for preparing pure isobutylene. More specifically, it involves a process for preparing pure isobutylene by decomposing t-butyl esters.

Pure isobutylene is in demand for the preparation of butyl rubber and liquid polyisobutylenes which are widely used in the manufacture of lubricant additives and also as a starting material for isoprene manufacture by a series of reactions involving condensation of formaldehyde and isobutylene to yield a dioxane which is decomposed to form isoprene. Present procedures for the manufacture of isobutylene do not yield a product of the desired purity without additional treatment such as expensive fractional distillation. One commercial procedure for obtaining isobutylene involves the treatment of a $C_4$ refinery stream comprising n-butane, isobutane, n-butenes and isobutylene—also called a "B—B" stream—with cold sulfuric acid which preferentially extracts isobutylene; on heating the isobutylene-containing sulfuric acid extract phase, the isobutylene polymerizes and is recovered therefrom as diisobutylene which on cracking yields isobutylene monomer. This method of obtaining isobutylene from a $C_4$ hydrocarbon stream has the disadvantage that the isobutylene thus produced contains as impurities some n-butenes and butadiene. The process of this invention provides a method for preparing pure isobutylene by catalytic decomposition of t-butyl esters.

In accordance with this invention, a t-butyl ester of hydrocarbyl monocarboxylic acid containing 2–18 and preferably 2–8 carbon atoms, is heated in the presence of a minor amount of a strong non-volatile mineral or organic acid to a temperature of 90 to 225° F. whereby the t-butyl ester decomposes to give pure isobutylene and monocarboxylic acid. The pure isobutylene is readily separated from the reaction mixture because of its low boiling point. The non-volatile mineral acid which catalyzes the thermal decomposition of the t-butyl ester to isobutylene and acid is present in the reaction mixture in a concentration between 0.05 and 6.0 weight percent of the t-butyl ester.

The t-butyl ester employed in the process of this invention has the formula: $RCOOC(CH_3)_3$ wherein R is a hydrocarbyl radical containing 1–17 carbon atoms and is preferably an aliphatic hydrocarbyl radical containing 1–7 carbon atoms. Particularly preferred t-butyl esters for use in the process of the invention are t-butyl acetate, t-butyl propionate, t-butyl 2-ethylhexanoate and t-butyl butyrate. Other useful esters art t-butyl benzoate, t-butyl laurate, t-butyl stearate, t-butyl myristate, t-butyl oleate. t-Butyl acetate, which has recently been announced as an octane appreciator for leaded gasolines, is the preferred ester for use in this invention since its contemplated use as a gasoline additive will make it a large volume chemical of commerce.

The non-volatile strong acids which catalyze the thermal decomposition of t-butyl esters are sulfuric acid, phosphoric acid, and organic-substituted derivatives thereof containing at least one acidic hydrogen atom such as benzene sulfonic acid, lauryl sulfate, toluene sulfonic acid, butyl dihydrogen phosphate, methyl dihydrogen phosphate and petroleum sulfonic acid. These acids are used in concentrated form to avoid ester hydrolysis. Sulfuric acid is the preferred material for catalyzing the thermal decomposition of t-butyl esters into isobutylene and monocarboxylic acids. The effective acids are described as non-volatile to exclude the mineral-halo acids such as hydrochloric acid and hydrobromic acid which react with isobutylene liberated during decomposition to form isobutyl halides.

The non-volatile acid is added to the t-butyl ester in a concentration equivalent to 0.05 to 6.0 weight percent of the ester with concentrations between 0.1 and 1.5 weight percent being preferred. Concentrations of acid higher than 6.5 weight percent decrease the production of pure isobutylene by promoting its polymerization at the 90–225° F. temperature range employed in the process of the invention. The preferred acid concentration of 0.1 to 1.5 weight percent catalyzes the decomposition without any substantial polymerization of the liberated isobutylene.

The acid-containing t-butyl ester is heated to temperatures of 90–225° F. with the resulting decomposition of the ester into isobutylene and monocarboxylic acid. When the temperatures are maintained at the prescribed range, quantitative yields of isobutylene are obtained in the process of the invention. The preferred temperature range for the decomposition of t-butyl ester is between 135 and 180° F.

The decomposition of t-butyl ester in the presence of non-volatile strong mineral or organic acid is advantageously effected at atmospheric pressure although pressures as high as 30 p.s.i.g. may be employed. Since higher pressures favor ester formation, the decomposition is normally effected at atmospheric pressure.

The process of the invention is effected under substantially anhydrous conditions to reduce hydrolysis of the ester to alcohol and acid.

The process of the invention is illustrated in the following examples:

*Example 1*

1057 gms. of t-butyl acetate containing 5.3 weight percent 98% sulfuric acid was charged to a reaction vessel fitted with a 4' long 13 mm. diameter reflux column packed with Heligrids and having a reflux ratio of 20:1. The reaction mixture was heated to a pot temperature of 138° F. at which point decomposition of t-butyl acetate could be observed as the mixture distilled. The overhead from the column distilled off at 19° F. (−7.2° C.) and was collected in a trap cooled in a mixture of Dry Ice and acetone. Analysis of the overhead proved to be high purity isobutylene. A total of 463 cc. of overhead weighing 306.6 gms. was collected. The residue which had amounted to 705 cc. weighing 730 gms. had a specific gravity at 60° F. of 1.050 indicating it to be essentially acetic acid which has a specific gravity of 1.043 at 60° F. plus sulfuric acid used as a catalyst. The only condensable gas present in the overhead was isobutylene.

In contrast with the sulfuric acid catalyzed decomposition shown in Example 1, the data in Example 2 demonstrate the more severe conditions required for decomposition of t-butyl acetate in the absence of catalytic amounts of sulfuric acid and show the lower purity of isobutylene thus obtained.

*Example 2* t-Butyl acetate, which was free of mineral acid as indicated by a neut. No. below 0.3 and which had a boiling point range of 206.6–208.4° F. (97 to 98° C.) was heated in a reaction vessel fitted with a reflux column to a pot temperature over 215° F. without any noticeable decomposition of the t-butyl acetate. On passing the t-butyl acetate through a hot tube containing glass wool at a temperature of about 500° F., the ester decomposed into acetic acid and isobutylene. The isobutylene obtained as a result of the thermal decomposition at a temperature of 500° F. contained about 0.7 butane and 1.0% carbon dioxide, the latter indicating acetic acid decomposition.

A series of runs was made in which 99% pure t-butyl ester was mixed with different amounts of concentrated (sp. gr. 1.84) sulfuric acid. The blends were then heated in a 4' long 13 mm. diameter Podbielniak Hypercal column. The results obtained in this series of experiments are shown in Examples 3 through 6.

*Example 3*

248.5 gms. t-butyl acetate containing 0.5 weight percent concentrated sulfuric acid was heated to a pot temperature ranging between 135 and 164° F. The overhead from the distillation column was collected in a series of traps cooled in a Dry Ice-acetone mixture. The distillation was continued until approximately 107 ml. of distillate was obtained. Vapor phase chromatographic analysis of the distillate showed that the only condensable gas present therein was isobutylene. The major impurities in the distillate were t-butyl acetate, acetic acid and t-butanol entrained in the isobutylene formed during decomposition; the total concentration of these impurities was 2.3 weight percent. Analysis of the organic residue of the distillation showed 86.2% acetic acid, 12.4% t-butyl acetate, 0.8% t-butanol, 0.5% isobutylene and 0.2% diisobutylene; the acid catalyst was also present in the residue.

*Example 4*

280 ml. of pure t-butyl acetate containing 1.0 weight percent concentrated sulfuric acid was heated to a pot temperature between 135 and 191° F. until 133 ml. of distillate was taken off as an overhead fraction. Analysis of this fraction showed that the only condensable gas present therein was isobutylene with minor amounts of t-butyl acetate, acetic acid and t-butanol entrained in the isobutylene formed during the catalytic decomposition; these impurities totalled about 1.4 weight percent. Analysis of the organic components of the residue showed 96.2% acetic acid, 3.3% t-butyl acetate, 0.3% t-butanol, 0.1% isobutylene and 0.2% diisobutylene. The acid catalyst was also present in the residue.

*Example 5*

288 ml. of pure t-butyl acetate containing 2% concentrated sulfuric acid was heated to a pot temperature between 90 and 160° F. until an overhead distillate fraction comprising 68 ml. was obtained. Analysis of the overhead fraction indicates that the only condensable gas present therein was isobutylene. The other components of the distillate fraction in a total of about 1.5 weight percent were t-butanol, acetic acid, and t-butyl acetate. Analysis of the organic components of the residue showed 83.6% acetic acid, 10.6% t-butyl acetate, 3.2% diisobutylene, 2.0% t-butanol and 0.6% isobutylene; the acid catalyst was also present in the residue. The higher concentration of diisobutylene in this example wherein 2.0 weight percent sulfuric acid was employed shows the desirability of using sulfuric acid concentrations in the preferred range of 0.1 to 1.5 weight percent to avoid polymer formation.

*Example 6*

285 ml. of t-butyl acetate containing 0.1 weight percent concentrated sulfuric acid was heated to a pot temperature between 170 and 200° F. until 75 ml. of distillate was obtained. Analysis of the distillate indicated that the only condensable gas present therein was isobutylene. The impurities in the overhead distillate totalled approximately 1.5 weight percent and comprised t-butyl acetate, acetic acid and t-butanol entrained in the isobutylene liberated in the decomposition. Analysis of the organic components of the residue showed 61.2% t-butyl acetate, 34.8% acetic acid, 3.3% isobutylene and 0.6% t-butanol, 0.1% diisobutylene; the acid catalyst was also present in the residue.

The results obtained in the above examples demonstrate the effectiveness of the catalytic process of the invention for producing pure isobutylene. It is particularly noteworthy that in Example 3 through 6 in which the distillate fractions and residue fractions were subjected to extensive analysis by mass spectroscopy and vapor phase chromatography, that isobutylene was the only condensable gas formed and that there was no evidence of acetic acid decomposition which would have been indicated by the presence of methan, $CO_2$ or acetone in the overhead cuts.

Obviously, many modifications and variations of the invention as hereinbefore set forth may be made without departing from the spirit and scope thereof and, therefore, only such limitations should be imposed as are indicated in the appended claims.

We claim:

1. A process for preparing pure isobutylene which comprises heating a t-butyl ester of a hydrocarbyl monocarboxylic acid containing 2–18 carbon atoms in the presence of 0.05 to 6.0 weight percent non-volatile concentrated strong acid selected from the group consisting of sulfuric acid, phosphoric acid and organic substituted derivatives thereof containing at least one acidic hydrogen atom to a temperature between 90 and 225° F. to yield pure isobutylene and a $C_2$ to $C_{18}$ hydrocarbyl monocarboxylic acid, and separating said isobutylene as a distillate from said acid.

2. A process according to claim 1 in which said t-butyl ester is derived from an aliphatic hydrocarbyl monocarboxylic acid containing 2–8 carbon atoms.

3. A process according to claim 1 in which said t-butyl ester is t-butyl acetate.

4. A process according to claim 1 in which said strong acid is present in a concentration between 0.1 and 1.5 weight percent.

5. A process for preparing pure isobutylene which comprises heating t-butyl ester of a hydrocarbyl monocarboxylic acid containing 2–8 carbon atoms in the presence of 0.05 to 6.0 weight percent concentrated sulfuric acid to a temperature between 90 and 225° F. to yield pure isobutylene as a distillate and a $C_2$–$C_{18}$ hydrocarbyl monocarboxylic acid as a residual fraction.

6. A process according to claim 5 in which said t-butyl ester is t-butyl acetate.

7. A process according to claim 5 in which said sulfuric acid is employed in a concentration of 0.1–1.5 weight percent.

8. A process according to claim 5 in which said t-butyl ester is heated to a temperature between 135 and 180° F. at atmospheric pressure.

References Cited in the file of this patent

UNITED STATES PATENTS

| | | |
|---|---|---|
| 1,877,291 | Frolich et al. | Sept. 13, 1932 |
| 2,041,193 | Lee | May 19, 1936 |
| 2,304,872 | Bachman et al. | Dec. 15, 1942 |
| 2,375,724 | Anderson et al. | May 8, 1945 |

OTHER REFERENCES

Hurd et al.: Jour. of American Chem. Soc., 1938, vol. 60, pages 2419–2425.